Patented Aug. 5, 1941

2,251,580

UNITED STATES PATENT OFFICE 2,251,580

CONVERSION OF OLEFINIC HYDROCARBONS

Robert F. Ruthruff, Chicago, Ill., assignor to Chempats Incorporated, a corporation of Delaware No Drawing. Application December 4, 1939, Serial No. 307,446

12 Claims. (Cl. 196—10)

This invention relates to the conversion of olefinic hydrocarbons to hydrocarbons of higher boiling points. More particularly, this invention relates to the conversion of low boiling olefinic hydrocarbons, especially normally gaseous olefinic hydrocarbons, to hydrocarbons of higher boiling points to produce a liquid product peculiarly suitable for use as a motor fuel or as a blending material for such fuel by reason of the high octane number and high octane blending value of said liquid product.

This invention has among its objects the use for the conversion of olefinic hydrocarbons to hydrocarbons of higher boiling points of a catalyst of high conversion efficiency, said efficiency being maintained over long periods without liability to physical disintegration, and said catalyst after long use being capable of regeneration whereby its original activity is restored. Said catalyst is particularly adapted for use in the conversion of propylene and the butylenes which may be easily and rapidly polymerized with the production of liquid hydrocarbons boiling for the greater part within the usual motor fuel range.

For the conversion of olefinic hydrocarbons to hydrocarbons of higher boiling points by the polymerization thereof, the use of catalysts consisting of oxygen acids of pentavalent phosphorus, either as such or in the form of free acid adsorbed on or absorbed by solid bodies, has been suggested. Various salts of oxygen acids of pentavalent phosphorus have also been suggested as catalysts for the conversion of olefinic hydrocarbons to hydrocarbons of higher boiling points. Among the catalysts that have been suggested for effecting this conversion may be mentioned orthophosphoric acid, orthophosphoric acid promoted by a heavy metal salt such as copper phosphate, orthophosphoric acid absorbed on carbon, mixtures of orthophosphoric acid and diatomaceous earth, mixtures of orthophosphoric acid with copper phosphate and cadmium phosphate, and, finally, copper pyrophosphate. All of these catalysts, while capable of effecting the conversion of olefinic hydrocarbons to hydrocarbons of higher boiling points, show various disadvantages. For example, catalysts consisting of free oxygen acids of pentavalent phosphorus or such acids promoted by minor amounts of heavy metal salts present equipment corrosion problems that are difficult and expensive, if not impossible, to solve. The so-called "solid phosphoric acids," consisting essentially of free phosphoric acid held in a matrix, also present corrosion problems unless care is taken to prevent temperatures falling below the dew point of water when water vapor is present in the reaction space and, in addition, such catalysts commonly disintegrate during use. Salts of oxygen acids of pentavalent phosphorus also commonly disintegrate during use and frequently present corrosion problems.

According to the present invention a catalyst is employed for the conversion of olefinic hydrocarbons to hydrocarbons of higher boiling points that is hard and not subject to physical disintegration and that furthermore presents no corrosion problems. It has been discovered in connection with this invention that superior results in the conversion of olefinic hydrocarbons to hydrocarbons of higher boiling points may be obtained by the use of a catalyst, the active ingredient in which consists of an adsorption complex of phosphoric acid on hydrous stannic oxide.

Any suitable method may be used for the preparation of the new catalyst. In general, the catalyst is prepared by contacting phosphoric acid (or a solution of a phosphate) with hydrous stannic oxide or by forming hydrous stannic oxide in the presence of phosphoric acid or a solution of a phosphate. As is well known to those skilled in the art, hydrous stannic oxide may be formed by a variety of methods, for example, by treating the solution of a stannate with acid, by the addition of alkali to solutions of stannic salts, or by the action of nitric acid on tin. More specifically, it has been found that the preparation of the catalyst for use in the present invention may be effected most conveniently by one of the methods outlined in the examples given below.

*Example 1.*—A solution is made by dissolving 200 g. sodium metastannate in 2000 cc. water. The solution is then treated with 40 cc. 85% orthophosphoric acid. The mixture is stirred and acid, for example concentrated nitric acid, is added slowly until the resulting solution is strongly acid. The precipitate that forms is removed by filtration, washed thoroughly, and dried. The final catalyst is obtained in the form of hard opalescent lumps.

*Example 2.*—A mixture is made containing 309 cc. concentrated nitric acid, 34 cc. 85% orthophosphoric acid, and 691 cc. water. The solution resulting is cooled, and 65 g. of tin in the form of foil is slowly added. After the resultant violent reaction has subsided the mixture is boiled for an hour, following which the precipitate is removed by filtration, washed thoroughly, and dried. The final catalyst is obtained in the form of white flakes easily formed into pills or other suitable shapes.

*Example 3.*—A mixture containing 3000 cc. water, 19.5 cc. concentrated hydrochloric acid, and 75 cc. 85% phosphoric acid is brought to a boil, and a freshly prepared solution made by dissolving 150 g. stannic chloride (pentahydrate) in 150 cc. cold water is added with stirring. The resulting precipitate is removed by filtration and after washing is dried to give the catalyst in the form of hard opalescent lumps.

While the scope of this invention is to be in no way limited by any theories proposed, it is believed that the catalyst consists of phosphoric acid or phosphate ion adsorbed on the surface of the precipitated stannic oxide or hydrous stannic oxide. It has been found that for maximum activity it is preferable to contact the phosphate with the freshly formed oxide or hydrous oxide. If the oxide or hydrous oxide is allowed to age before being contacted with the phosphate, adsorption of the latter is decreased so that catalysts of lowered initial activity and shorter active life result. It is believed that on ageing the individual particles of stannic oxide or hydrous stannic oxide coalesce into larger aggregates having less adsorptive surface per unit weight than fresh material and hence exhibiting less adsorptive capacity. For this reason it is advisable to contact the phosphate with the adsorbent when the latter is in the nascent or freshly formed state. It will be observed that this has been accomplished in the three examples given above. In Examples 1 and 2 the adsorbent is actually formed in the presence of the phosphate, while in Example 3 the stannic chloride solution used is freshly prepared, thus eliminating the growth of micelles of hydrous stannic oxide formed in the stannic chloride solution by hydrolysis.

Some investigators are of the opinion that materials prepared according to the methods outlined above consist of stannic phosphate. This does not appear likely, however, since the composition of the precipitate formed varies appreciably with variations in preparative procedure that have no effect on the composition of precipitates formed by true metathesis. For example, when freshly prepared stannic chloride solution is added to a dilute solution of phosphate, a precipitate is obtained having a high phosphoric oxide—stannic oxide ratio. If, on the other hand, the stannic chloride solution is boiled for a short time or is allowed to stand for an appreciable period before being added to the dilute phosphate, the precipitates obtained have appreciably lower phosphoric oxide—stannic oxide ratios.

In carrying out the present invention, the olefinic hydrocarbons or the mixture of hydrocarbons containing olefines is passed in contact with the catalyst held in a suitable chamber or reactor, the reaction gases being suitably preheated for the reaction.

As an example of the results obtained by the use of the catalyst of this invention, data obtained on converting pure isobutylene at atmospheric pressure in the presence of a catalyst prepared according to Example 1 will be described. The olefinic gas was preheated to a temperature of 400° F. and was passed over 25 g. of the catalyst at a rate of 0.3 cubic feet per hour. At the end of a four-hour on-stream period 30 cc. of liquid conversion product had been formed, equivalent to about 25% conversion based on the charge.

As is well known to those skilled in the art, the rate of polymerization of olefinic hydrocarbons is a function of the concentration of these materials, and accordingly, from economic considerations, such reactions are best run at superatmospheric pressure. Any suitable pressure may be used, but it is preferable to employ relatively high pressure, for example in excess of 150 pounds per square inch, although it is evident that the catalyst exhibits its polymerizing activity at atmospheric pressure and even exhibits its conversion ability at pressures below atmospheric.

The optimum operating temperature will depend somewhat upon the nature of the material under treatment and the product desired. For example, for the conversion of gaseous olefines such as propylene and the butylenes, a temperature in the range of approximately 300–450° F. is advantageous for effecting maximum conversion to a product containing essentially only motor fuel components. Under otherwise similar conditions, propylene requires a higher temperature for a given conversion than the butylenes. Ethylene is scarcely affected by the catalyst of this invention. Only by operating under rather severe conditions, for example 1400 pounds pressure, a temperature of 450° F., and a flow rate of 5 cubic feet of charge per hour per pound of catalyst, is conversion of this olefine appreciable, and even when operating in this manner it is doubtful whether the conversions obtained are of commercial importance. However, it has been found that ethylene in the presence of higher olefines such as propylene and the butylenes is converted at a much higher rate than when alone or diluted with paraffins. This is attributed to cross polymerization with the more reactive higher olefines rather than true polymerization of an ethylene molecule with another of the same species.

While this invention is particularly directed to the polymerization of normally gaseous olefines, it is not limited thereto, being applicable to normally liquid olefines such as the pentenes, the hexenes, and higher homologues.

The extent of reaction and the character of the liquid product are influenced also by the length of time during which the charge remains in contact with the catalyst under its operating conditions, in other words, the space velocity of the charge. In general, the charge is passed over the catalyst at a rate of 2 to 40 cubic feet of charge, measured as a gas at standard conditions of temperature and pressure, per pound of catalyst per hour.

It is apparent that with any given charge the extent of reaction and the character of the product depend mainly on the operating pressure, the operating temperature, and the space velocity of the charge. It is obvious that many combinations of these variables will yield the desired amount and quality of product. As an example of satisfactory operating conditions, it may be cited that on passing a charge containing 15% isobutylene, 35% normal butylene, and 50% paraffins over the catalyst at a temperature of 350° F., a pressure of 1400 pounds per square inch, and at a rate of 20 cubic feet of charge per pound of catalyst per hour, practically all of the isobutylene is converted together with approximately 60–70% of the normal butenes present. In the present case higher conversion of the normal butenes was not deemed desirable. By decreasing either or any combination of these variables—temperature, pressure, or time of contact—even less than the quoted amount of normal butylenes reacts while conversion of isobutylene remains practically constant. On the other hand, more complete polymerization of the normal butylenes results when the operating conditions are more severe. With a charge containing 30-35% propylene and 65-70% paraffins about 85% of the olefine is converted when operating at a temperature of 375° F., a pressure of 1400 pounds, and a space velocity of 10 cubic feet of charge per pound of catalyst per hour.

If desired, the charge before passing to the reactor may be desulfurized, and gum-forming components may be removed by known means.

In the conversion reaction proper, the charge may, if desired, be passed through two or more catalyst-filled reactors in series, and means may be provided for the recycling of unconverted gas back to the reactor or reactors. It has been found that the activity of the catalyst may be maintained for longer periods if the charge is saturated with water. In some cases it is advisable to incorporate from 1 to 6% steam by volume in the gaseous charge.

While the present invention has been described in connection with details or specific examples thereof, it is not intended that these shall be regarded as limitations upon the scope of the invention except insofar as included in the accompanying claims.

I claim:

1. The process of converting olefinic hydrocarbons to hydrocarbons of higher boiling points by the polymerization thereof comprising contacting said olefinic hydrocarbons at elevated temperatures with a catalyst comprising as an active ingredient an adsorption complex of phosphoric acid on hydrous stannic oxide.

2. The process of converting olefinic hydrocarbons to higher boiling hydrocarbons within the motor fuel boiling range by the polymerization thereof comprising contacting said olefinic hydrocarbons at elevated temperatures with a catalyst comprising as an active ingredient an adsorption complex of phosphoric acid on hydrous stannic oxide.

3. The process of converting olefinic hydrocarbons to hydrocarbons of higher boiling points by the polymerization thereof comprising contacting, at elevated temperature mixtures containing olefinic hydrocarbons with a catalyst comprising as an active ingredient an adsorption complex of phosphoric acid on hydrous stannic oxide.

4. The process of converting olefinic hydrocarbons to higher boiling hydrocarbons within the motor fuel boiling range by the polymerization thereof comprising contacting, at elevated temperature, mixtures containing olefinic hydrocarbons with a catalyst comprising as an active ingredient an adsorption complex of phosphoric acid on hydrous stannic oxide.

5. The process of converting normally gaseous olefines to hydrocarbons of higher boiling points by the polymerization thereof comprising contacting said olefinic hydrocarbons at elevated temperatures with a catalyst comprising as an active ingredient an adsorption complex of phosphoric acid on hydrous stannic oxide.

6. The process of converting normally gaseous olefines to higher boiling hydrocarbons within the motor fuel boiling range by the polymerization thereof comprising contacting said olefinic hydrocarbons at elevated temperatures with a catalyst comprising as an active ingredient an adsorption complex of phosphoric acid on hydrous stannic oxide.

7. The process of converting normally gaseous olefines to hydrocarbons of higher boiling points by the polymerization thereof comprising contacting, at elevated temperature, mixtures containing said olefines with a catalyst comprising as an active ingredient an adsorption complex of phosphoric acid on hydrous stannic oxide.

8. The process of converting normally gaseous olefines to higher boiling hydrocarbons within the motor fuel boiling range by the polymerization thereof comprising contacting, at elevated temperature, mixtures containing said olefines with a catalyst comprising as an active ingredient an adsorption complex of phosphoric acid on hydrous stannic oxide.

9. The process of treating a mixture of hydrocarbons containing normal olefines and iso-olefines to effect conversion of a portion thereof to hydrocarbons of higher boiling points by the polymerization thereof comprising contacting said mixture of hydrocarbons with a catalyst comprising as an active ingredient an adsorption complex of phosphoric acid on hydrous stannic oxide under conditions of temperature, pressure and time suitable to effect the preferential polymerization of said iso olefines.

10. The process of treating a mixture of hydrocarbons containing normal olefines and iso-olefines to effect conversion of a portion thereof to hydrocarbons of higher boiling points within the motor fuel boiling range by the polymerization thereof comprising contacting said mixture of hydrocarbons with a catalyst comprising as an active ingredient an adsorption complex of phosphoric acid on hydrous stannic oxide under conditions of temperature, pressure and time suitable to effect preferential polymerization of said iso olefines.

11. The process of treating a mixture of hydrocarbons containing normal butylenes and isobutylene to effect the conversion of a portion thereof to hydrocarbons of higher boiling points by the polymerization thereof, comprising contacting said mixture of hydrocarbons with a catalyst comprising as an active ingredient an adsorption complex of phosphoric acid on hydrous stannic oxide under conditions of temperature, pressure and time suitable to effect preferential polymerization of said isobutylene.

12. The process of treating a mixture of hydrocarbons containing normal butylenes and isobutylene to effect the conversion of a portion thereof to hydrocarbons of higher boiling point within the motor fuel boiling range by the polymerization thereof, comprising contacting said mixture of hydrocarbons with a catalyst comprising as an active ingredient an adsorption complex of phosphoric acid on hydrous stannic oxide under conditions of temperature, pressure and time suitable to effect preferential polymerization of said isobutylene.

ROBERT F. RUTHRUFF.